United States Patent [19]

Silverman et al.

[11] Patent Number: 4,998,354

[45] Date of Patent: Mar. 12, 1991

[54] MECHANICAL SHAPE SENSOR

[75] Inventors: Michael W. Silverman, Highland Park; Michael Heinrich, Chicago, both of Ill.; Clifford E. Brubaker, Charlottesville; Colin A. McLaurin, Crozet, both of Va.

[73] Assignee: Pin Dot Products, Niles, Ill.

[21] Appl. No.: 540,842

[22] Filed: Jun. 20, 1990

[51] Int. Cl.[5] .............................................. G01B 5/20
[52] U.S. Cl. .................................... 33/514.2; 33/561.1
[58] Field of Search .................................. 33/551–554, 33/561.1, 3 B, 3 C, 15, 514.2; 128/774, 779, 781, 780

[56] References Cited

U.S. PATENT DOCUMENTS

| | | | |
|---|---|---|---|
| 1,830,648 | 11/1931 | Engel | 33/514.2 |
| 2,162,916 | 6/1939 | Hyland | 33/3 C |
| 2,378,039 | 6/1945 | Schenker | 33/514.2 X |
| 3,264,382 | 8/1966 | Angell et al. . | |
| 3,458,898 | 8/1969 | Casparis . | |
| 3,830,896 | 8/1974 | Flicker et al. . | |
| 4,046,611 | 9/1977 | Sanson . | |
| 4,413,540 | 11/1983 | Burge . | |
| 4,454,090 | 6/1984 | Saumell . | |
| 4,470,782 | 9/1984 | Zimmerman, Jr. et al. . | |
| 4,493,877 | 1/1985 | Burnett . | |
| 4,525,130 | 6/1985 | Netznik . | |
| 4,615,856 | 10/1986 | Silverman . | |
| 4,637,789 | 1/1987 | Netznik . | |
| 4,697,240 | 9/1987 | Cedar et al. . | |
| 4,867,922 | 9/1989 | Zuccato . | |
| 4,876,758 | 10/1989 | Rolloff et al. | 33/551 X |
| 4,890,235 | 12/1989 | Reger et al. . | |

FOREIGN PATENT DOCUMENTS 0281493 1/1915 Fed. Rep. of Germany ..... 33/514.2

OTHER PUBLICATIONS

*The Chicago Insert: An Approach to Wheelchair Seating for the Maintenance of Spinal Posture in Duchenne Muscular Dystrophy,* Siegel et al., pp. 27–29 (date unknown).
*Hip Angle and Upper Extremity Movement Time in Children with Cerebral Palsy,* RESNA 8th Annual Conference, pp. 39–41, 1985.
*Instrumented, Adjustable Seat for Evaluating Posture and Body Contours,* Reger et al., RESNA 8th Annual Conference, pp. 335–337, 1985.
*Shape and Pressure Distribution on Wheelchair Cushions,* Reger et al., RESNA 8th Annual Conference, pp. 341–343, 1985.

(List continued on next page.)

*Primary Examiner*—Harry N. Haroian
*Attorney, Agent, or Firm*—Emrich & Dithmar

[57] ABSTRACT

Apparatus for measuring and providing a two-dimensional representation of the contour of a person's thighs and buttocks or the dorsal and lateral surfaces of a person's trunk facilitates the fabrication of custom contoured seat cushions such as for use by wheelchair users. The apparatus includes a frame having a rectangular matrix of compressible, resilient support elements with a generally flat upper surface. Attached to the upper surface of each support element is one end of a flexible, incompressible cable which is inserted through a conduit with a 90° bend for directing the cable toward and beyond a side of the frame. Second end portions of the cable and conduit combinations are in parallel, planar alignment. The cable is free to move within and along the length of the conduit such that downward displacement of the upper surface of a support element and first end of a cable coupled thereto causes the cable's second end to be moved outward from the frame. By arranging the second end portions of the cables in a cyclic manner in accordance with the number of support elements in a given row within the matrix, the three-dimensional contoured support surface of a person sitting on the array of support elements is presented in two dimensions in a format which is easily recorded and reproduced for fabricating a custom contoured seat cushion.

24 Claims, 4 Drawing Sheets

OTHER PUBLICATIONS

*Weightbearing Tissue Contour and Deformation by Magnetic Resonance Imaging*, Reger et al., RESNA 9th Annual Conference, pp. 387–389, 1986.

*Research and Development Considerations and Engineering Perspective*, Douglas A. Hobson, Clinical Prosthetics and Orthotics, vol. 10, No. 4, pp. 122–129, 1986.

*Computer Aided Prescription of Specialized Seats for Wheelchairs*, Reger et al., Yugoslav Committee for Electronics and Automation, Advances in External Control of Human Extremities IX, pp. 559–562, 1987.

*Analysis of Compression, Shear and Surface Tension on Seat Cushions*, Chung et al., RESNA 10th Annual Conference, pp. 269–271, 1987.

*Comparative Evaluation of Pressure Distribution on Flat Foams and Contoured Cushions*, Chung et al., RESNA 10th Annual Conference, pp. 323–325, 1987.

*Body Contours and Pressure Distributions of Normal and SCI Subjects on Wheelchair Cushions*, Chung et al., RESNA 10th Annual Conference, pp. 515–517, 1987.

*Clinical Application of the Adjustable "Computer Chair"*, McGrew et al., RESNA 10th Annual Conference, pp. 568–570, 1987.

*Design of a Computer Aided Manufacturing System for Custom Contoured Wheelchair Cushions*, Brienza et al., ICAART 88-Montreal, pp. 312–313, 1988.

*Effect of Contoured Support Surface on Pressure Distribution*, Chung et al., ICAART 88-Montreal, pp. 314–315, 1988.

MECHANICAL SHAPE SENSOR

BACKGROUND OF THE INVENTION

This invention relates generally to the manufacture of cushions such as used in seating and is particularly directed to apparatus for measuring and recording an impression of a person's seat contact contour, i.e., buttocks and thighs as well as dorsal and lateral trunk surfaces.

Recent advances in rehabilitation technology have improved the products available which cushion and support a person while seated. Maintaining a functional seated posture for a long period of time requires special support particularly for the elderly who incur more than 70% of reported pressure sores. Pressure sores arise from bony protuberances which cause areas of excessive pressure restricting blood flow to the surrounding tissue. In order to avoid pressure sores, the person must be frequently moved in those areas to which blood circulation has been restricted and massaged in attempting to prevent the formation of an ulcer. Appropriate body support is required to provide protection from this type of tissue trauma, prevent poor posture and enhance functional capabilities of those restricted to the seated posture.

Custom contoured cushions have been recognized as providing the support and comfort necessary for those who remain seated for extended periods. Various approaches have been undertaken to fabricate user contoured seat cushions which provide the desired support and comfort. One approach makes use of several aluminum templates which provide support and which are bendable to form a contoured support surface. This approach not only requires a separate cushion to be placed over the contoured support surface, but also provides a support surface which generally only remotely approaches the seating support surface contour of a user because of the difficulty in manually bending the aluminum plates to match the user's contour. Another approach employs a wooden frame having a plurality of apertures into which dowels are inserted in a snugly fitting manner. Each of the dowels may be chiseled down to a given length to match the support surface of an intended user. Upholstery including padding is then positioned over and in contact with the dowel ends to provide a continuous contoured seating surface. This approach is time consuming, expensive and generally unpredictable.

Yet another approach to forming a contoured seating cushion employs a flexible bag containing a granular material and fitted with a valve so that the bag can be maintained in a condition evacuated of air. The bag in its non-evacuated state is pushed against one who is to be supported and the granular material flows to allow the bag to take a shape closely conforming to the user's shape. The bag is then evacuated through the valve, causing the granular material to become pressed by virtue of the resulting pressure differential across the wall of the bag. The previously flexible support device thus becomes rigid, with the granular material becoming locked into a rigid support mass in a shape conforming to the shape of the body being supported. One problem with this approach is in the requirement for maintaining the bag in an evacuated condition for extended periods of time. As the bag becomes evacuated, or the vacuum is otherwise lost, conformance of the bag to the shape of a user is also lost.

Another approach, such as disclosed in U.S. Pat. No. 4,615,856 to Silverman, also employs bead-filled bags to make an impression of the seat and back portions of an intended user by evacuating the bags attached to a molding frame. A positive mold of the individual's respective backside and buttocks impressions are made, which is then utilized with another apparatus to mold a custom fitted seat cushion. Although capable of accurately contouring the cushions to an intended user's contour, this approach requires a rather expensive air bag fitted molding frame operated by one with specialized training.

Yet another approach creates a computer model of the cushion contours from data obtained through a contour measurement process which employs contour gauges designed to detect tissue deflection and contact with regular foam cushions. Data reflecting the pressure at the body-cushion interface is then used by the computer to control a three-dimensional milling machine for cutting out the cushion from a foam plastic blank. This approach requires sophisticated and expensive equipment used by one with special training in its control and operation.

The present invention addresses the aforementioned limitations of the prior art by providing a mechanical shape sensor for measuring the three-dimensional contour of a person's thighs and buttocks as well as one's dorsal and lateral trunk surfaces and providing a two-dimensional representation of this contoured surface to facilitate fabrication of custom contoured seat cushions. The mechanical shape sensor is inexpensive, easily operated, can be used to form seat cushions for even the most deformed and misshapen persons, and provides a contoured seating surface which matches that of an intended user with high accuracy.

OBJECTS AND SUMMARY OF THE INVENTION

Accordingly, it is an object of the present invention to provide an improved apparatus and method for measuring and recording the surface contour of a person's thighs and buttocks as well as dorsal and lateral trunk surfaces.

It is another object of the present invention to provide a low cost, portable, easily used, mechanical shape sensor for measuring the contour of a person's seating support surface for use in fabricating custom contoured seat cushions.

Yet another object of the present invention is to provide an arrangement and method for measuring the shape of the buttock-cushion interface, transmitting this contour information to a remote fabrication facility, and fabricating a seat cushion having a support surface contoured in accordance with the buttock-cushion interface measurement.

A further object of the present invention is to convert the measurement of a three-dimensional contoured surface to a two-dimensional graphic representation for use in forming a support cushion having the measured contoured surface.

This invention contemplates apparatus for measuring and recording the contour of a person's seating support surface, the apparatus comprising: a plurality of compressible, resilient elements disposed in a generally planar array and adapted to receive a person seated thereon, wherein upper portions of the elements are deflected in accordance with the person's seating support surface; a plurality of flexible, non-compressible members each having a first end coupled to an upper portion of a respective one of the elements; guide means coupled to each of the members for aligning second end portions of each of the members in a planar array; indicator means coupled to a each of the members and moveable with its associated member as the member is displaced upon compression of an element with a person positioned thereon; and recording means for engaging the indicator means and recording the relative positions of the indicator means in a two-dimensional format.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENTS

Figure 1:
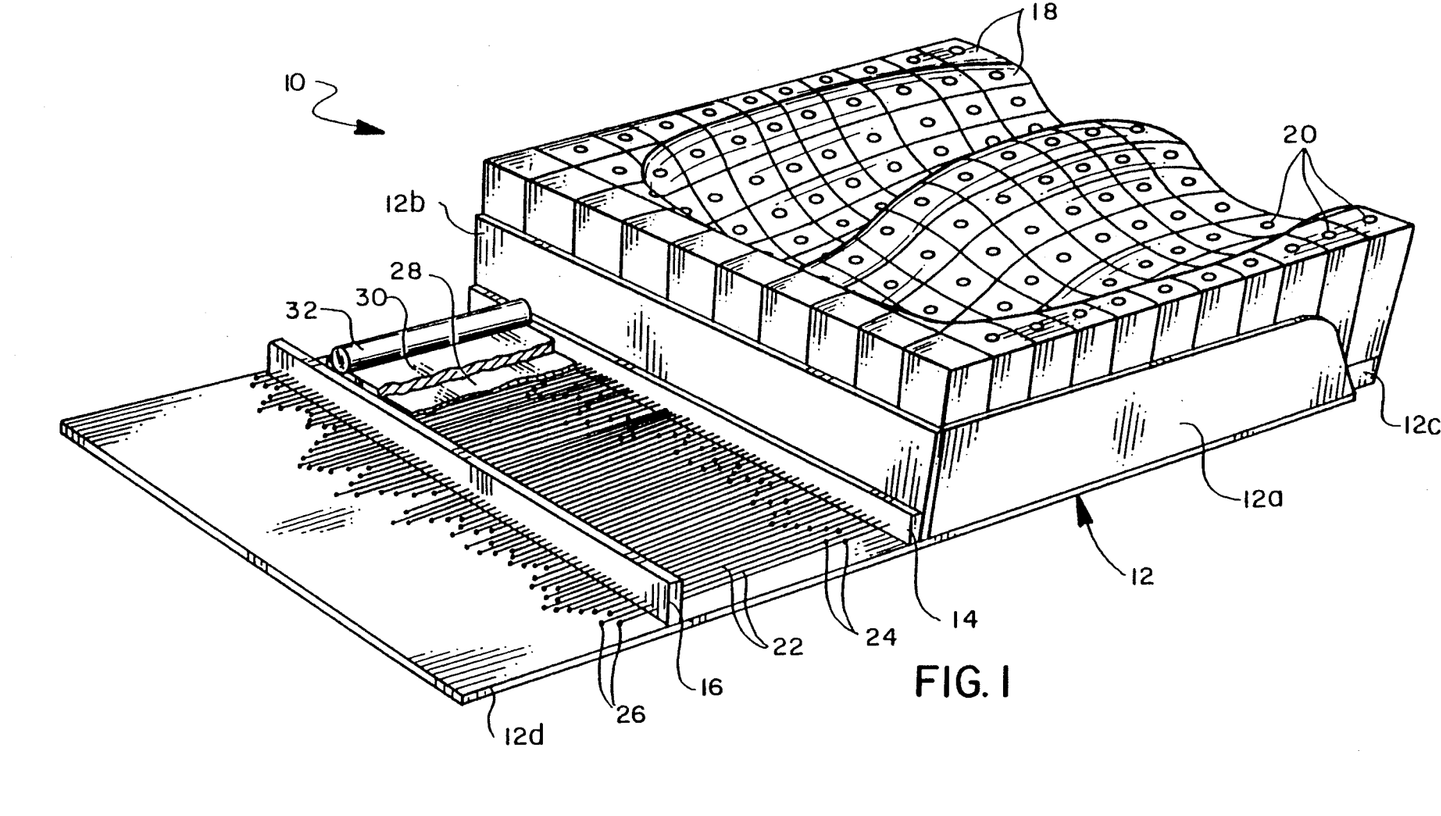
FIG. 1 is a perspective view of a mechanical shape sensor in accordance with the principles of the present invention.

Referring to FIG. 1, there is shown a perspective view of a mechanical shape sensor 10 in accordance with the principles of the present invention.

The mechanical shape sensor 10 includes a frame 12 comprised of a plurality of coupled side frame members 12a and 12b (a third side frame member is not shown in the figure), a frame base 12c, and a frame support member 12d. The side frame members 12a and 12b as well as the frame base 12c are positioned upon and attached to the frame support member 12d. Positioned on an upper surface of the frame base 12c are a plurality of resilient, compressible elements 18. The resilient, compressible elements 18 may be formed from a single resilient, compressible body such as comprised of foam rubber by cutting an upper portion of the resilient, compressible body into a plurality of generally square elements separated by intermediate grooves. In the preferred embodiment of the present invention, an upper portion of the resilient, compressible body is divided into a 10×10 matrix of individual elements 18. A person whose buttocks and thigh contour is to be measured and recorded is positioned upon the resilient, compressible elements 18 which assume the shape of the contoured seating surface of the person as shown in FIG. 1. In a preferred embodiment, an aft row of resilient elements which are not used in forming the contoured surface may be included as shown in FIG. 1. This row of elements provides improved support for a person whose seating surface contour is being measured and recorded. While this invention is described herein for use in measuring and recording the contour of one's buttocks and thighs, it is equally applicable to measuring the contact contour of virtually any support surface such as one's dorsal and lateral trunk surface.

Attached to side frame member 12b along the length thereof is a first alignment bar 14. Attached to the frame support member 12d is a second alignment bar 16 which is positioned in spaced relation from, and parallel to the first alignment bar 14. Each of the first and second alignment bars 14, 16 is an elongated, linear member having a plurality of spaced apertures along the length thereof through which a cable 22 passes as described below. Each of the cables 22 thus passes through a respective pair of aligned apertures in the first and second alignment bars 14, 16. In a preferred embodiment, the first and second alignment bars 14, 16 as well as that portion of the frame support member 12d coupled to and disposed between the alignment bars are formed as a generally unitary structure comprised of a high strength, lightweight metal.

Figure 3:
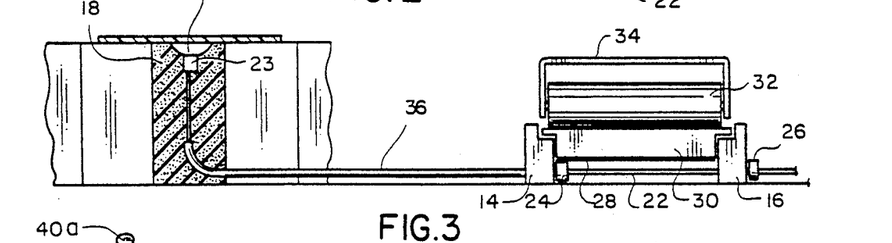
FIG. 3 is a lateral sectional view of the mechanical shape sensor of FIG. 1.

As shown in the lateral, sectional view of FIG. 3, an elongated aperture, or slot, is formed within each of the resilient, compressible elements 18. Inserted through this slot is a cable, or member, 22 which is flexible and non-compressible. To the first end of the cable 22 adjacent to an upper surface of the resilient, compressible element 18 is attached a cable connector 20. The cable connector 20 in one embodiment is a threaded washer, while to the first end of the cable 22 is attached a threaded male coupler 23 for attachment to the cable connector. Also inserted in the slot within the resilient, compressible element 18 adjacent a lower portion thereof is a curved conduit 36. The conduit 36 provides an elongated, hollow channel within which the cable 22 is inserted and along which the cable may be linearly displaced. A second end portion of the cable 22 is inserted through respective aligned apertures within the first and second alignment bars 14 and 16. Vertical displacement of an upper portion of the resilient, compressible element 18 when a person sits on the mechanical shape sensor results in a corresponding vertical displacement of its associated cable connector 20 and the first end of a cable 22 attached thereto. The non-compressible nature of the cable 22 causes the second end portion thereof to undergo a similar, although horizontal, displacement when the first end of the cable is displaced in a vertical direction.

Figure 2:
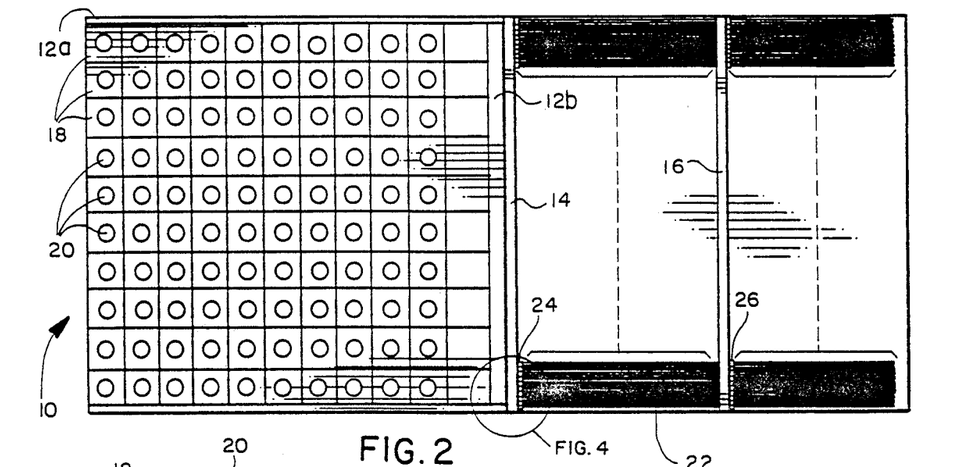
FIG. 2 is a top plan view of the mechanical shape sensor of FIG. 1.

Attached to each of the cables 22 adjacent to the second end portion thereof is a cable stop 26. Also attached to each of the cables 22 intermediate the cable stop 26 and the first end of the cable is a positioning indicator, or recording point, 24. Each of the positioning indicators 24 and cable stops 26 is securely attached to a cable 22 in a fixed manner so as to be displaced with the cable. In one embodiment, the cable 22 is comprised of strands of steel, while the positioning indicators 24 and cable stops 26 are in the form of metal beads crimped onto the wire. As particularly shown in FIGS. 2, 3 and 4, each of the positioning indicators 24 disposed on a respective one of the cables 22 engages and is in abutting contact with the first alignment bar 14 when there is no pressure applied to an upper portion of the resilient, compressible elements 18 through which the cables pass. When pressure is applied to an upper surface of the resilient, compressible elements 18, such as when a person sits on the mechanical shape sensor 10, the cable connector 22 and the first end of the cable 22 will be displaced downward and its associated positioning indicator 24 will move to the right as viewed in FIGS. 2, 3 and 4. Similarly, application of pressure on an upper portion of a resilient, compressible element 18 will also cause rightward displacement of the cable stop 26 attached to its associated cable 22. The distance a positioning indicator 24 is displaced from the first alignment bar 14 when pressure is applied to the resilient, compressible element 18 to which the positioning indicator is coupled by means of its associated cable 22 depends upon the magnitude of the pressure applied. The larger the pressure applied in a downward direction to an upper portion of the resilient, compressible element 18, the further the associated positioning indicator 24 will be displaced from the first alignment bar 14. This is shown in FIG. 1 where the upper surface formed by the plurality of resilient, compressible elements 18 is shown contoured such as with a person sitting on the mechanical shape sensor 10. The distance of each of the positioning indicators 24 from the first alignment bar 14 depends upon the extent of depression of its associated resilient, compressible element 18. The positioning indicators 24 are used in making a record in two dimensions of the three-dimensional contour of the upper surface of the mechanical shape sensor 10 as described below. The cable stops 26 are positioned adjacent a second end of each of the cables 22 so as to engage the second alignment bar 16 when each of the resilient, compressible elements 18 is in a non-compressed, fully extended configuration. This ensures that prior to use, the upper surface of the mechanical shape sensor 10 formed of the plurality of resilient, compressible elements 18 is generally planar, or flat.

While the displacement translation means has been described in terms of the combination of a cable 22 and conduit 36, the present invention is not limited to such an arrangement. For example, curved, rigid shafts in mutual alignment could also be used to translate a three-dimensional contour to a two-dimensional graphic representation.

Figure 5A:
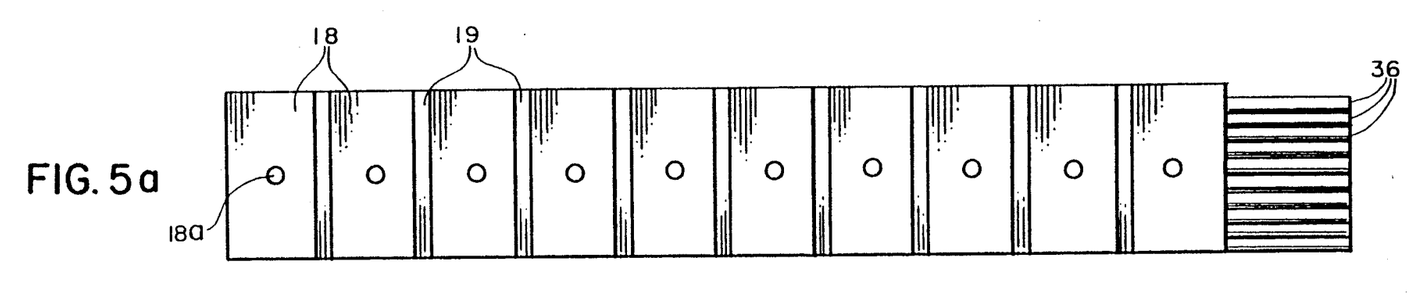
FIGS. 5a, 5b and 5c are respectively top, side and bottom plan views of a portion of the mechanical shape sensor shown in FIG. 1.
Figure 5B:
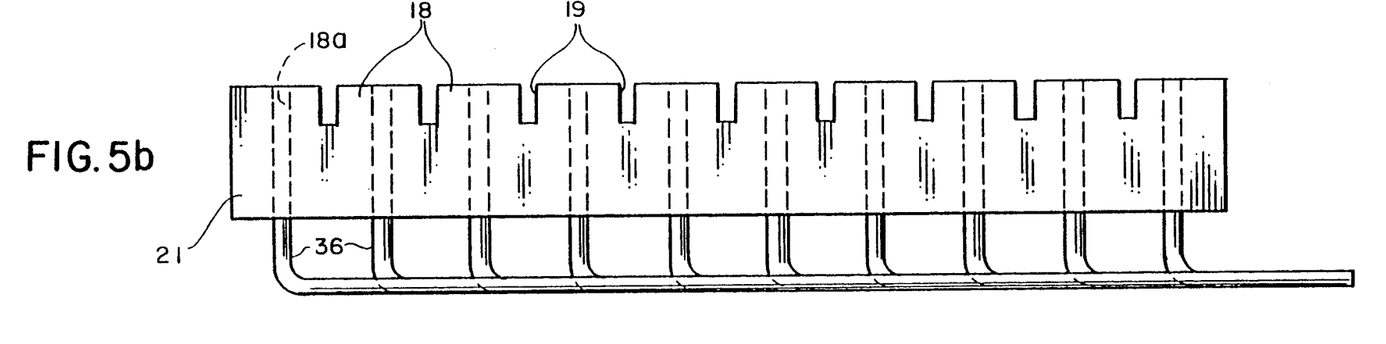
Figure 5C:
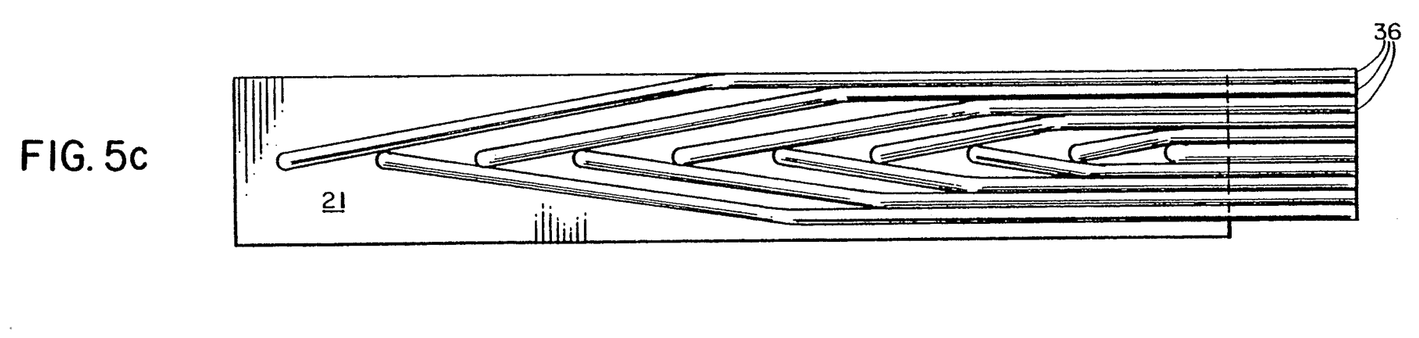

Referring to FIGS. 5a, 5b and 5c, there are respectively shown top, side and bottom plan views of a row of resilient, compressible elements and connections thereto used in the mechanical shape sensor of the present invention. As shown in FIGS. 5a and 5b, there is disposed through each of the resilient, compressible elements 18 an elongated, linear channel 18a through which one of the aforementioned cables is inserted. A plurality of slots, or gaps, 19 are cut into the upper surface of the resilient, compressible body to form the individual elements 18 in a preferred embodiment of the present invention. These slots 19 limit the surface tension of the mechanical shape sensor 10. Each of the conduits 36 is generally provided with a 90° bend and is inserted in a lower end of a respective one of the channels 18a within a resilient, compressible element 18. Each of the conduits 36 is preferably comprised of a lightweight, relatively strong material such as of metal. Because each of the conduits 36 coupled to resilient, compressible elements 18 in a single row are connected to the element channels 18a arranged in a linear array, the conduits are bent inwardly toward the linear array of channels as shown in FIG. 5c. Thus, each of the conduits 36 is provided with a generally 90° bend from vertical to horizontal as well as an acute angle bend as viewed from above (or below). As shown in FIG. 5c, each of the conduits 36 is inserted in a lower end of a respective channel in the base of the resilient, compressible body 21 which is formed into the aforementioned resilient, compressible elements 18 on the upper surface thereof.

Referring again to FIGS. 1 and 2, there is shown an arrangement for recording in two dimensions the three-dimensional contour of the mechanical shape sensor 10 defined by the resilient, compressible elements 18. The contour recording arrangement includes a recording medium 28, a pressure plate 30 and a roller 32 having a handle 34 to facilitate manual operation of the roller. The recording medium 28 is preferably of the pressure sensitive type, such as carbon paper, and is adapted for engaging the plurality of positioning indicators 24 when pressure is applied to the recording medium in a downward direction by means of the pressure plate 30 as the roller 32 is displaced over the pressure plate. A series of recording points is impressed upon the recording medium 28, with the recording points corresponding directly to the positions of the positioning indicators 24 between the first and second alignment bars 14, 16 and indirectly to the contour of the upper surface of the mechanical shape sensor 10 defined by the upper portions of each of the resilient, compressible elements 18.

Figures 4, 6:
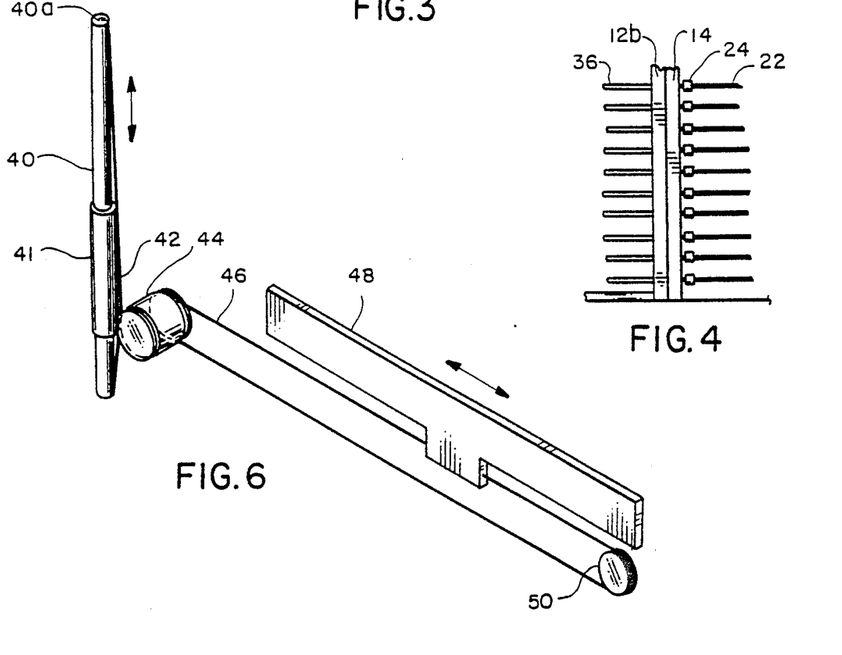
FIG. 4 is a plan view of a portion of the mechanical shape sensor shown in FIG. 2.
FIG. 6 is a perspective view of a motion translation arrangement for use in one embodiment of the present invention.

Referring to FIG. 6, there is shown a perspective view of another arrangement for converting vertical displacement of a moveable support member 40 into horizontal displacement of a position indicator 48. The moveable support member 40 is coupled to and supported by a mounting bracket 41 within which it is slidable in a vertical direction. An upper end 40a of the moveable support member 40 is coupled to one of many moveable elements defining a contourable support surface. Attached to upper and lower ends of the moveable support member 40 is a first cable 42 which is wound around a first portion of a first roller 44. Upward or downward displacement of the moveable support member 40 and first cable 42 attached thereto causes rotational displacement of the first roller 44. Attached to a second portion of the first roller 44 is a second cable 46 which is displaced by rotation of the first roller. A second roller 50 or other support means may be used to support the second cable 46 to permit its displacement with rotation of the first roller 44. Attached to the second cable 46 so as to move therewith is a position indicator 48. Thus, rotation of the first roller 44 causes displacement of the combination of the second cable 46 and the position indicator 48. Vertical displacement of the moveable support member 40 in response to a person sitting on a contourable support surface will therefore result in translational displacement of the position indicator 48. It can easily be seen that a number of such moveable support members 40 and position indicators 48 could be used to convert the three-dimensional contour of a seat support surface to a two-dimensional graphic representation which can be recorded for use in forming a contoured cushion by conventional means. In addition, linear displacement of the moveable support member 40 and the position indicator 48 need not be in a 1:1 relationship. For example, by tapering the first roller 44, or making its diameter at respective ends different, the displacement of the position indicator 48 may be made greater than or less than the vertical displacement of the moveable support member 40. Thus, by making the diameter of that portion of the first roller 44 about which the second cable 46 is wound smaller than the diameter of the roller about which the first cable 42 is wound, the position indicator 48 will undergo a greater displacement than that of the moveable support member 40. This will provide more accurate positioning information regarding the upper end 40a of the moveable support member 40 and the surface contour of a person seated thereon. A small difference in vertical height between adjacent moveable support members would thus appear as a larger difference in horizontal position between adjacent position indicators 48 for more accurate contour measuring and recording.

Figure 7:
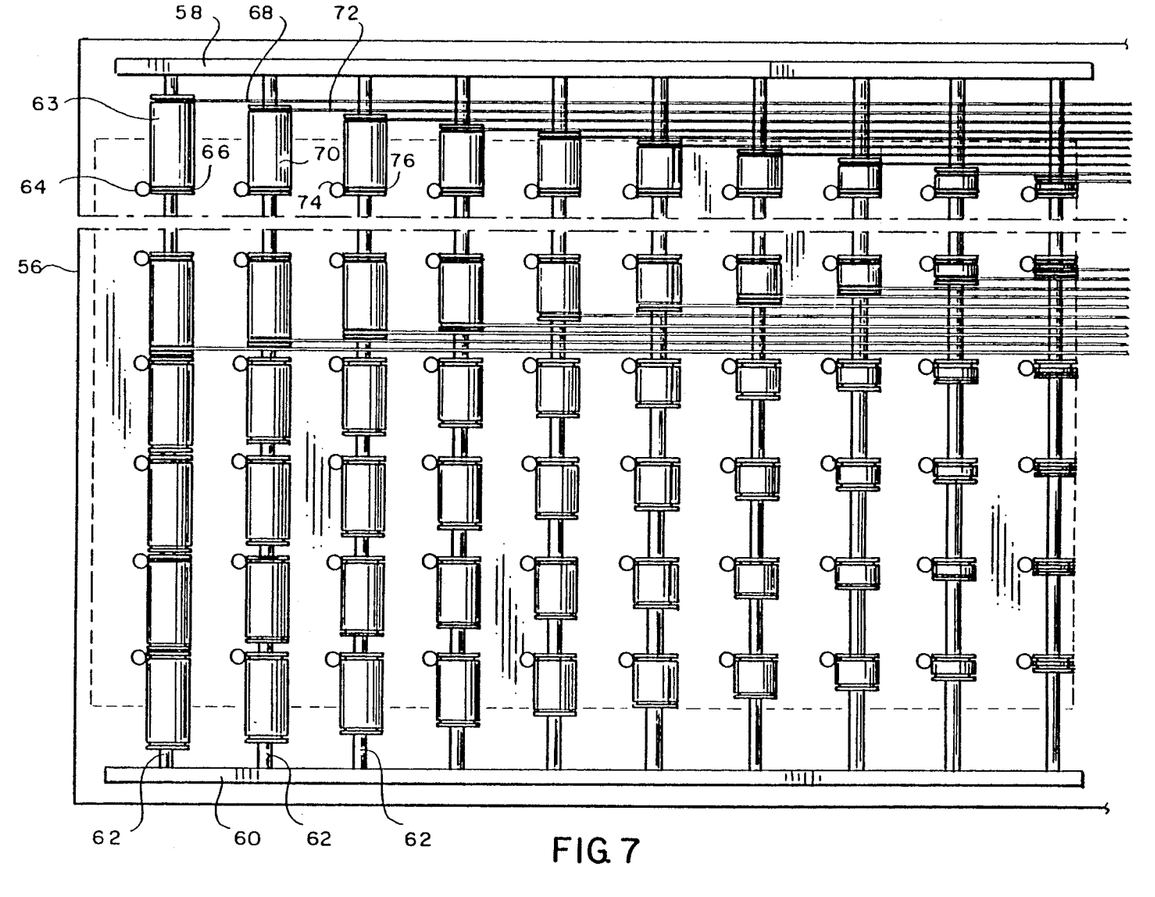
FIG. 7 is a bottom plan view of a mechanical shape sensor employing a plurality of motion translation arrangements as shown in FIG. 6.

Referring to FIG. 7, there is shown a bottom plan view of a mechanical shape sensor incorporating the motion translation arrangement of FIG. 6. The displacement translation arrangement of FIG. 7 includes a plurality of spaced shafts 62 coupled at respective ends thereof to first and second mounting brackets 58 and 60. Each of the rollers is cylindrical in shape and is adapted to receive and engage first and second cables. Thus, a first roller 63 is positioned adjacent to a moveable support member 64 and engages a cable 66 attached to the moveable support member. The first roller 63 also engages a second cable 68 wrapped around its other end. Vertical displacement of the moveable support member 64 causes rotational displacement of the first roller 63 and a corresponding linear displacement of the second cable 68 and a positioning indicator (not shown) attached thereto. A second roller 70 is positioned adjacent to and coupled to a second moveable support member 74 via a cable 76. The first and second moveable support members 64 and 74 are coupled to adjacent support elements on an upper portion of the mechanical shape sensor which are not shown in the figure for simplicity. From FIG. 7, it can be seen that the length of each of the rollers attached to a row of support elements varies. Thus, those rollers which are closest to the contour recording portion of the apparatus are the shortest. In this arrangement it can also be seen that the cables coupled to rollers associated with support elements in a common row are grouped together. In addition, corresponding positions in each of the rows of support elements are organized in a cyclic manner in a two-dimensional graphic representation of the three-dimensional, contoured, upper surface of the mechanical shape sensor.

There has thus been shown a mechanical shape sensor which is inexpensive, easy to use, readily adapted for recording seat contour information, and provides accurate surface contour information for use in the fabrication of custom contoured seat support cushions. The mechanical shape sensor converts the three-dimensional contour information relating to a person's thighs and buttocks or dorsal and lateral trunk surface to a two-dimensional graphic representation which can be used for accurately forming a seat cushion in accordance with the person's seating surface contour.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for measuring and recording the contour of a person's seating support surface, said apparatus comprising:
   a plurality of compressible, resilient elements disposed in a generally planar array and adapted to receive a person seated thereon, wherein upper portions of said elements are deflected in accordance with the person's seating support surface;
   a plurality of flexible, non-compressible members each having a first end coupled to an upper portion of a respective one of said elements;
   guide means coupled to each of said members for aligning second end portions of each of said members in a planar array;
   indicator means coupled to a each of said members and moveable with its associated member as the member is displaced upon compression of an element with a person positioned thereon; and
   recording means for engaging said indicator means and recording the relative positions of said indicator means in a two-dimensional format.

2. The apparatus of claim 1 wherein each of said compressible, resilient elements is comprised of foam rubber.

3. The apparatus of claim 2 wherein each of said compressible, resilient elements is generally square in cross-section and is arranged in closely spaced relation to a plurality of adjacent elements.

4. The apparatus of claim 3 wherein said compressible, resilient elements are comprised of a plurality of portions of a single foam cushion formed by cutting an upper portion of said foam cushion into an array of generally square elements.

5. The apparatus of claim 1 further comprising frame means for supporting said plurality of compressible, resilient elements in a generally square, planar array.

6. The apparatus of claim 5 wherein said frame means is coupled to and provides support for said guide means.

7. The apparatus of claim 1 wherein each of said members comprises a cable.

8. The apparatus of claim 7 wherein said cable is comprised of steel.

9. The apparatus of claim 7 wherein said guide means comprises a plurality of conduits for receiving and allowing for linear displacement of a respective cable therein.

10. The apparatus of claim 9 wherein each conduit includes a generally 90° bend for redirecting vertical displacement of a first end of a cable and an upper portion of a compressible, resilient element to which said cable is connected to a generally horizontal direction.

11. The apparatus of claim 1 further comprising coupling means for connecting a first end of each of said members to an upper surface of a respective element.

12. The apparatus of claim 11 wherein said coupling means comprises a plurality of combinations of a threaded member affixed to a first end of a member and a threaded washer disposed on an upper surface of a respective one of said compressible, resilient elements.

13. The apparatus of claim 12 wherein each element includes a slot therein through which a first end of a member is inserted.

14. The apparatus of claim 1 further comprising alignment means coupled to a second end portion of each of said members.

15. The apparatus of claim 14 wherein said alignment means includes first and second spaced bars each having a plurality of spaced apertures therein through which said members are inserted.

16. The apparatus of claim 1 wherein said indicator means includes an enlarged portion disposed along the length of each of said members.

17. The apparatus of claim 1 wherein said indicator means includes an apertured portion disposed along the length of each of said members through which a light beam is directed for determining the position of a second end portion of each of said members.

18. The apparatus of claim 1 further comprising stop means connected to a second end portion of each of said members for limiting upward displacement of a first end portion of the member and for aligning upper portions of each of said elements to define a generally flat surface.

19. The apparatus of claim 18 wherein said stop means includes, in combination, an alignment bar with a plurality of spaced apertures through each of which a respective one of said members is inserted and an enlarged portion on each of said members adjacent to a respective second end thereof.

20. The apparatus of claim 1 wherein said recording means includes a pressure sensitive medium and means for engaging and pressing said medium against said indicator means.

21. The apparatus of claim 20 wherein said means for engaging and pressing said pressure sensitive medium against said indicator means includes, in combination, a pliable layer and roller means for pressing said pliable layer against said indicator means.

22. The apparatus of claim 21 wherein said indicator means includes an enlarged portion disposed on each of said members adjacent to a second end portion thereof.

23. A method of recording the seating support contour of a person's buttocks and thighs comprising the steps of:
providing a generally planar support surface comprised of a plurality of vertically moveable elements allowing the support surface to assume the three-dimensional contour of a person's buttocks and thighs;
translating the vertical displacement of the moveable elements representing a three-dimensional contour into a two-dimensional graphic form; and
recording the two-dimensional graphic form of the seating support contour on a planar medium for use in forming a cushion contoured in accordance with the person's buttocks and thighs.

24. Apparatus for measuring and recording the contour of a person's seating support surface, said apparatuus comprising:
support means defining a deformable surface for receiving a person disposed thereon and engaging the person's seating support surface whereupon said surface assumes the three-dimensional contour of the person's seating support surface;
transformation means coupled to said support means for mechanically converting the three-dimensional contour of the person's seating support surface to a two-dimensional representation; and
recording means coupled to said transformation means for recording the two-dimensional representation of the person's seating support surface.

* * * * *